United States Patent
Chen et al.

(10) Patent No.: US 10,983,928 B2
(45) Date of Patent: Apr. 20, 2021

(54) METHOD AND COMPUTER PROGRAM PRODUCT FOR AUTOMATICALLY CONFIGURING PCIE SLOT

(71) Applicants: Inventec (Pudong) Technology Corporation, Shanghai (CN); INVENTEC CORPORATION, Taipei (TW)

(72) Inventors: Jin Chen, Shanghai (CN); Zhong-Ying Qu, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 2 days.

(21) Appl. No.: 16/567,009

(22) Filed: Sep. 11, 2019

(65) Prior Publication Data

US 2021/0004335 A1 Jan. 7, 2021

(30) Foreign Application Priority Data

Jul. 2, 2019 (CN) .......................... 201910590521.X

(51) Int. Cl.
*G06F 13/16* (2006.01)
*G06F 13/42* (2006.01)

(52) U.S. Cl.
CPC ...... *G06F 13/1668* (2013.01); *G06F 13/4282* (2013.01); *G06F 2213/0026* (2013.01)

(58) Field of Classification Search
CPC ............. G06F 13/1668; G06F 13/4282; G06F 2213/0026
See application file for complete search history.

(56) References Cited

U.S. PATENT DOCUMENTS 7,496,742 B2 * 2/2009 Khatri ................. G06F 13/4018
710/10
9,678,842 B2 * 6/2017 Zhang ................. G06F 11/2221

FOREIGN PATENT DOCUMENTS

CN 105302755 A * 6/2014 ............. G06F 13/40
CN 106569806 A * 10/2016 ............... G06F 9/44

* cited by examiner

*Primary Examiner* — Tammara R Peyton
(74) *Attorney, Agent, or Firm* — Locke Lord LLP; Tim Tingkang Xia, Esq.

(57) ABSTRACT

A method for automatically configuring a PCIe slot comprises: writing a configuration value into a storage device, with the configuration value associated with a configuration manner of the PCIE slot, reading the configuration value from the storage device by a BIOS, and determining whether the configuration value belongs to a valid value set, the BIOS configures a data bandwidth of the PCIe slot according to the configuration value when the configuration value belongs to a valid value set, and the BIOS configures the data bandwidth of the PCIe slot according to a default value when the configuration values does not belong to the valid value set.

8 Claims, 2 Drawing Sheets

METHOD AND COMPUTER PROGRAM PRODUCT FOR AUTOMATICALLY CONFIGURING PCIE SLOT

CROSS-REFERENCE TO RELATED APPLICATIONS

This non-provisional application claims priority under 35 U.S.C. § 119(a) on Patent Application No(s). 201910590521.X filed in China on Jul. 2, 2019, the entire contents of which are hereby incorporated by reference.

BACKGROUND

1. Technical Field

This disclosure relates to a configuration of PCIe slot, and more particularly to a method for automatically configuring PCIe slot.

2. Related Art

In order to meet the customer's need, manufactures have to provide a variety of server models for the customer to choose. In terms of the slot configuration of peripheral component interconnect express (PCIe) in a server, configurations of the PCIe slot vary between different server models. For example, for a PCIe slot having 16 data transmission channels, may electrically connect two network interface cards each occupying 8 data transmission channels or four solid state disks (SSD) each with a non-volatile memory express (NVMe). The two configuration types of the above examples respectively correspond to two different configurations of the PCIe slots, the former example needs to be set as x8x8, the latter example needs to be set as x4x4x4x4; it needs to be further set as x16 if connected to a display card occupying 16 data transmission channels.

In practice, configuration of the PCIe slot is mostly set up by a method of manually entering the interface provided by the basic input/output system (BIOS). However, the method causes a lot of inconvenience. First of all, since the massive number of server needs to be set up, manual configuration will cost a lot of time. Second, after the server is online, some operations, such as: updating BIOS, loading the BIOS default value, or clearing the complementary metal-oxide-semiconductor (CMOS) etc., will result in the configuration of PCIe slot being set back to the default value. As a result, manually entering BIOS to configure the PCIe slot is unfavourable for online maintenance.

SUMMARY

According to one or more embodiment of this disclosure, method for automatically configuring PCIe slot, comprising: writing a configuration value into a storage device, with the configuration value associated with a configuration manner of a PCIe slot; by a BIOS, reading the configuration value of the storage device; by the BIOS, determining whether the configuration value is valid by determining whether the configuration value belongs to a valid value set; by the BIOS, configuring a data bandwidth of the PCIe slot according to the configuration value when the configuration value belongs to the valid value set; and by the BIOS, configuring the data bandwidth of the PCIe slot according to a default value when the configuration value does not belong to the valid value set.

According to one or more embodiment of this disclosure, a computer program product stored in a non-transitory computer-readable storage medium, for a BIOS of a computer to automatically configure a PCIe slot when the computer program product is executed by the computer, comprising: a reading process driving the BIOS to read the configuration value from a storage device, with the configuration value used to configure a data bandwidth of a PCIe slot; a determining process driving the BIOS to examine whether the configuration value belongs to a valid value set; and a configuration driving the BIOS to selectively configure the data bandwidth of the PCIe slot by the configuration value or by a default value according to an examination result of the determining process.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
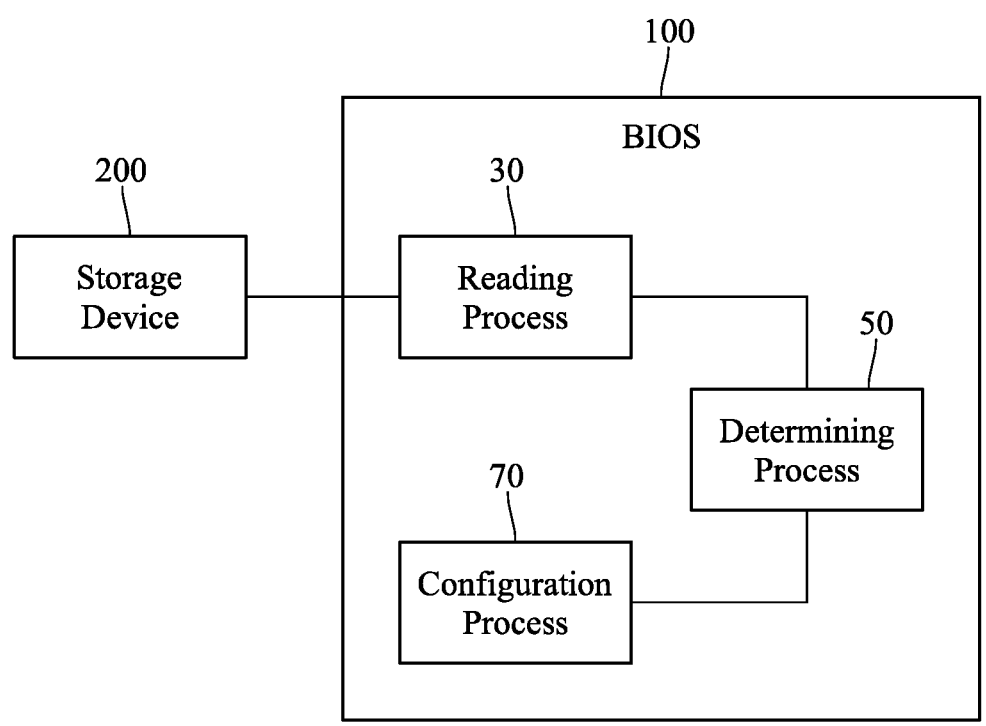
FIG. 1 is a block diagram of a computer program product stored in a non-transitory computer-readable storage medium according to one embodiment of the present invention.

Please refer to FIG. 1, which illustrates a computer program product stored in a non-transitory computer-readable storage medium of one embodiment of the present invention.

In practice, the PCIe slot that locates on a mainboard, for example, has 16 data transmission channels, but the present invention is not limited thereto. The computer program product described in one embodiment of the present invention can also be suitable for one or more PCIe slots having one of the X1, X4, X8 or X16 types of data transmission channels, wherein the numbers "1", "4", "8" and "16" denoted in the types (X1, X4, X8 and X16) represent the numbers of the data transmission channels. The PCIe specification is mainly for increasing the speed of all the buses inside a computer, therefore, the bandwidth has a variety of specifications. The X1-type PCIe slot described above has 36 pins; the X4-type PCIe slot has 64 pins; X8-type PCIe slot described above has 98 pins; X16-type PCIe slot described above has 164 pins. The more the data transmission channels, the wider the data transmission bandwidth is.

As shown in FIG. 1, the computer program product stored in a non-transitory computer-readable storage medium includes: a reading process 30, a determining process 50 and a configuration process 70. The computer program product can be executed by a computer.

Please refer to FIG. 1. The computer executes the reading process 30 to drive the BIOS 100 to read a configuration value from a storage device 200, wherein the configuration value is used to represent a type of configuration manner of the PCIe slot. The configuration value is pre-written into the storage device 200 before the server's date of manufacture. In practice, the storage device 200 described, for example, is an electrically-erasable programmable read-only memory (EEPROM) of a field replaceable unit (FRU). The information stored in the FRU includes information of the manufacturer, serial number, date of manufacture, etc. and the configuration value of the PCIe can be pre-written into an unused storage space (for example, a column of the unused storage space used to represent board product name) of the FRU for the BIOS 100 of one embodiment of the present invention to read. The BIOS 100 reads the information stored in the FRU when it's booted for the first time, the actual situation corresponding to the first boot described is, for example, updating the BIOS, clearing the CMOS, or executing a command of reading the default value by the BIOS etc.

Please refer to FIG. 1. The computer executes the determining process 50 to drive the BIOS 100 to examine whether the configuration value belongs to a valid value set. The valid value set is fixed in the BIOS 100, the valid value set includes a plurality of configuration patterns, for example, it can be predefined that: value 0x1 represents that the PCIe slot adopting the configuration of 16 data transmission channels occupied by one device; value 0x2 represents that the PCIe slot adopting the configuration of 8 data transmission channels occupied by each of two devices; value 0x3 represents that the PCIe slot adopting the configuration of 4 data transmission channels occupied by each of four devices; and value 0x4 represents that the PCIe slot adopting the configuration of 8 data transmission channels occupied by one device while 4 data transmission channels occupied by each of two other devices. Therefore, the valid value set is 0x1-0x4. It is assumed that the storage space distributed by the storage device 200 to every configuration value of the PCIe slot is 4 bits, then the configuration values 0x0, 0x5-0xf don't belong to the valid value set.

In one embodiment of the present invention, before the computer executes the reading process 30 to drive the BIOS 100 to read the configuration value in the storage device 200, the computer further drives the BIOS 100 to calculate a reading address according to a starting address and an offset. The computer then executes the reading process 30 to drive the BIOS 100 to read the configuration value at the storage device 200 according to the reading address.

Please refer to FIG. 1. The computer executes the configuration process 70 to drive the BIOS 100 to configure the data bandwidth of the PCIe slot by the configuration value or by a default value selectively according to a determination result obtained from the determining process 50. The described default value is one of the values of the valid value set, for example, 0x2. Therefore, in the determining process 50, if the BIOS 100 determines the configuration value read is 0x1, then the computer executes the configuration process 70 to drive the BIOS 100 to configure the data bandwidth of the PCIe slot in the X16 pattern. If the BIOS 100 determines in the determining process 50 that the configuration value read is 0x2, then the computer executes the configuration process 70 to drive the BIOS 100 to configure the data bandwidth of the PCIe slot in the X8X8 pattern.

Figure 2:
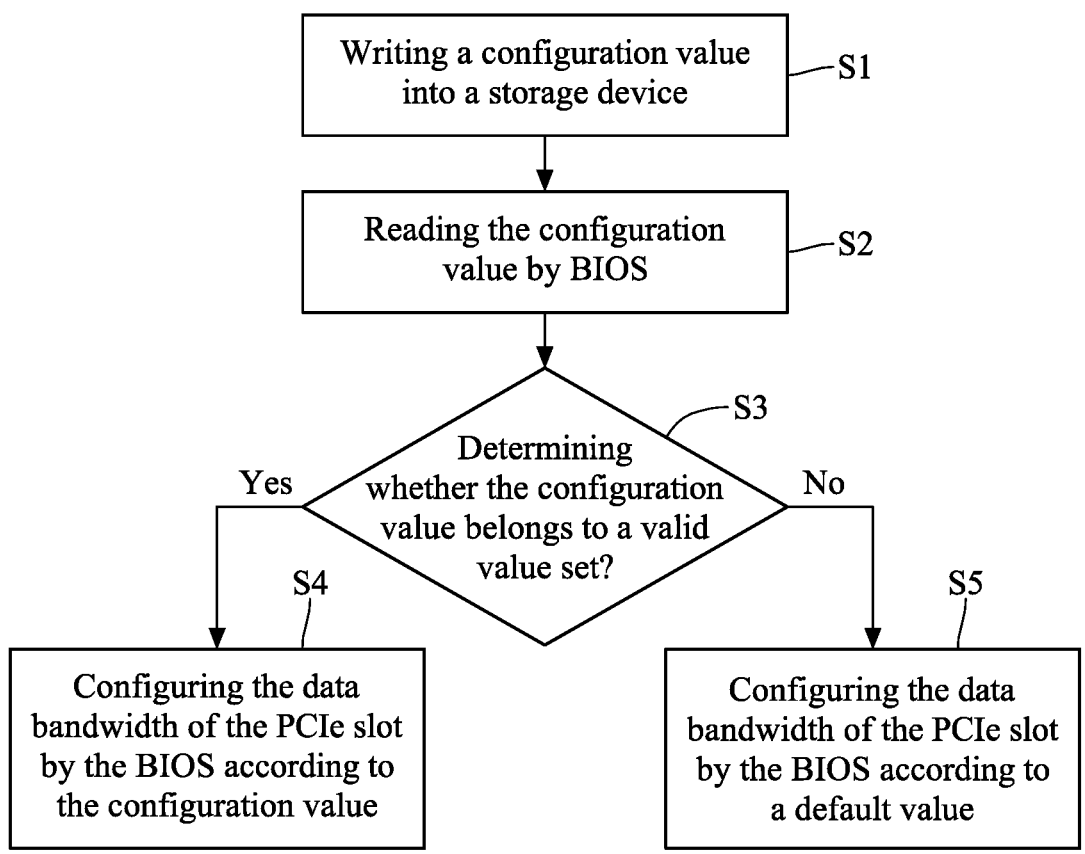
FIG. 2 is a flow chart of a method for automatically configuring PCIe slot according to one embodiment of the present invention.

Please refer to FIG. 2 and FIG. 1, wherein FIG. 2 illustrates a method for automatically configuring PCIe slot of one embodiment of the present invention.

Please refer to step S1, writing the configuration value into the storage device 200. The configuration value is associated with a configuration manner of the PCIe slot. The present invention is not particularly limited to the timing of writing the configuration value, the computer only needs to perform the process of the BIOS loading the default value once after the writing.

Please refer to step S2, reading the configuration value by the BIOS 100 in the storage device 200. In detail, the computer executing the reading process 30 can drive the BIOS 100 to obtain the configuration value at the storage device 200 according to the reading address calculated in the determining process 50. The described reading address is calculated according to a starting address and an offset. Therefore, the computer executing the reading process 30 can drive the BIOS 100 to read a plurality of configuration values according to different offsets.

Please refer to step S3, determining whether the configuration value read belongs to the valid value set. When the configuration value belongs to the valid value set, the computer executes the configuration process 70 to drive the BIOS 100 to configure the data bandwidth of the PCIe slot according to the configuration value, as shown in step S4. When the configuration value doesn't belong to the valid value set, the computer drives the BIOS 100 to configure the data bandwidth of the PCIe slot according to a default value, as shown in step S5. The default value can be configured as any one of the valid value set.

In view of the above description, the efficacy of the BIOS and method for automatically configuring PCIe slot disclosed in the present invention includes: BIOS may automatically configure the corresponding PCIe slot according to different server models without the involvement of personnel, therefore save the time of manual configuration, and at the same time avoid configuration error of the PCIe slot caused by improper operation of the operator. In addition, the present invention is beneficial to the subsequent online maintenance of the server.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. A method for automatically configuring PCIe slot, comprising:

writing a configuration value into a storage device, with the configuration value associated with a configuration manner of a PCIe slot;

by a BIOS, reading the configuration value of the storage device;

by the BIOS, determining whether the configuration value is valid by determining whether the configuration value belongs to a valid value set;

by the BIOS, configuring a data bandwidth of the PCIe slot according to the configuration value when the configuration value belongs to the valid value set; and by the BIOS, configuring the data bandwidth of the PCIe slot according to a default value when the configuration value does not belong to the valid value set, wherein the valid value set includes a plurality of configuration patterns, the plurality of configuration patterns comprises: 16 data transmission channels occupied by one device, 8 data transmission channels occupied by each of two devices, 4 data transmission channels occupied by each of four devices, and 8 data transmission channels occupied by one device while 4 data transmission channels occupied by each of two other devices.

2. The method for automatically configuring PCIe slot according to claim 1, before reading the configuration value of the storage device by the BIOS, further comprising: by the BIOS, calculating a reading address according to a starting address and an offset, wherein reading the configuration value of the storage device by the BIOS comprises reading the configuration value from the storage device according to the reading address by the BIOS.

3. The method for automatically configuring PCIe slot according to claim 1, wherein the storage device is a field replaceable device.

4. The method for automatically configuring PCIe slot according to claim 1, wherein the valid value set is fixed in the BIOS.

5. A computer program product stored in a non-transitory computer-readable storage medium, for a BIOS of a computer to automatically configure a PCIe slot when the computer program product is executed by the computer, comprising:

a reading process driving the BIOS to read a configuration value from a storage device, with the configuration value used to configure a data bandwidth of the PCIe slot;

a determining process driving the BIOS to examine whether the configuration value belongs to a valid value set; and a configuration driving the BIOS to selectively configure the data bandwidth of the PCIe slot by the configuration value or by a default value according to an examination result of the determining process, wherein the valid value set includes a plurality of configuration patterns, the plurality of configuration patterns comprises: 16 data transmission channels occupied by one device, 8 data transmission channels occupied by each of two devices, 4 data transmission channels occupied by each of four devices, and 8 data transmission channels occupied by one device while 4 data transmission channels occupied by each of two other devices.

6. The computer program product according to claim 5, before the reading process, further comprising driving the BIOS to calculate a reading address according to a starting address and an offset, and wherein the reading process further drives the BIOS to read the configuration value at the storage device according to the reading address.

7. The computer program product according to claim 5, wherein the storage device is a field replaceable device (FRU).

8. The computer program product according to claim 5, wherein the valid value set is fixed in the BIOS.

* * * * *